Aug. 22, 1939.   O. P. EGGLESTON   2,170,000
NONFREEZE TIP-UP
Filed May 2, 1938   2 Sheets-Sheet 1
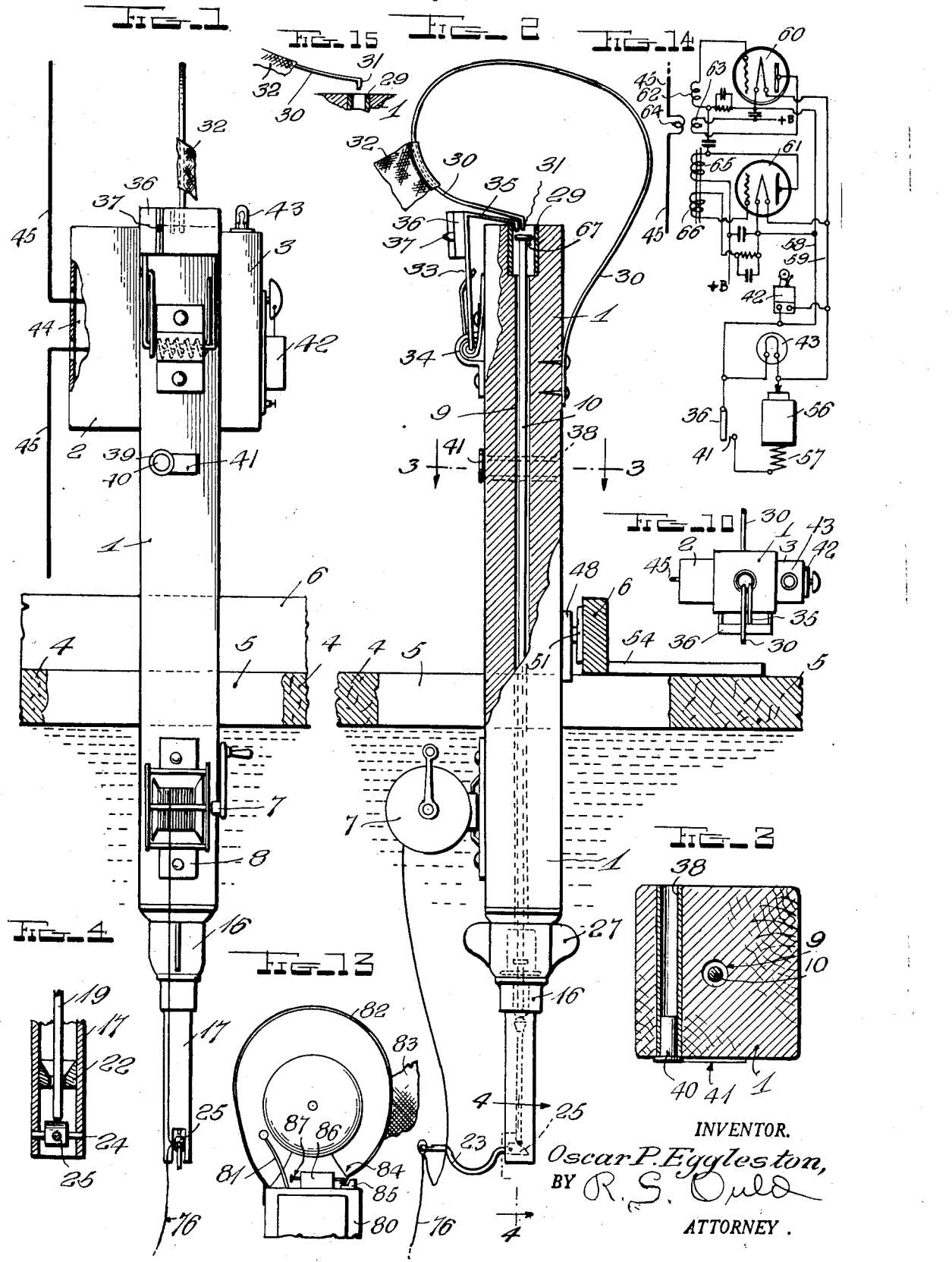
INVENTOR.
Oscar P. Eggleston,
BY R. S. Ould
ATTORNEY.

Aug. 22, 1939.   O. P. EGGLESTON   2,170,000
NONFREEZE TIP-UP
Filed May 2, 1938    2 Sheets-Sheet 2
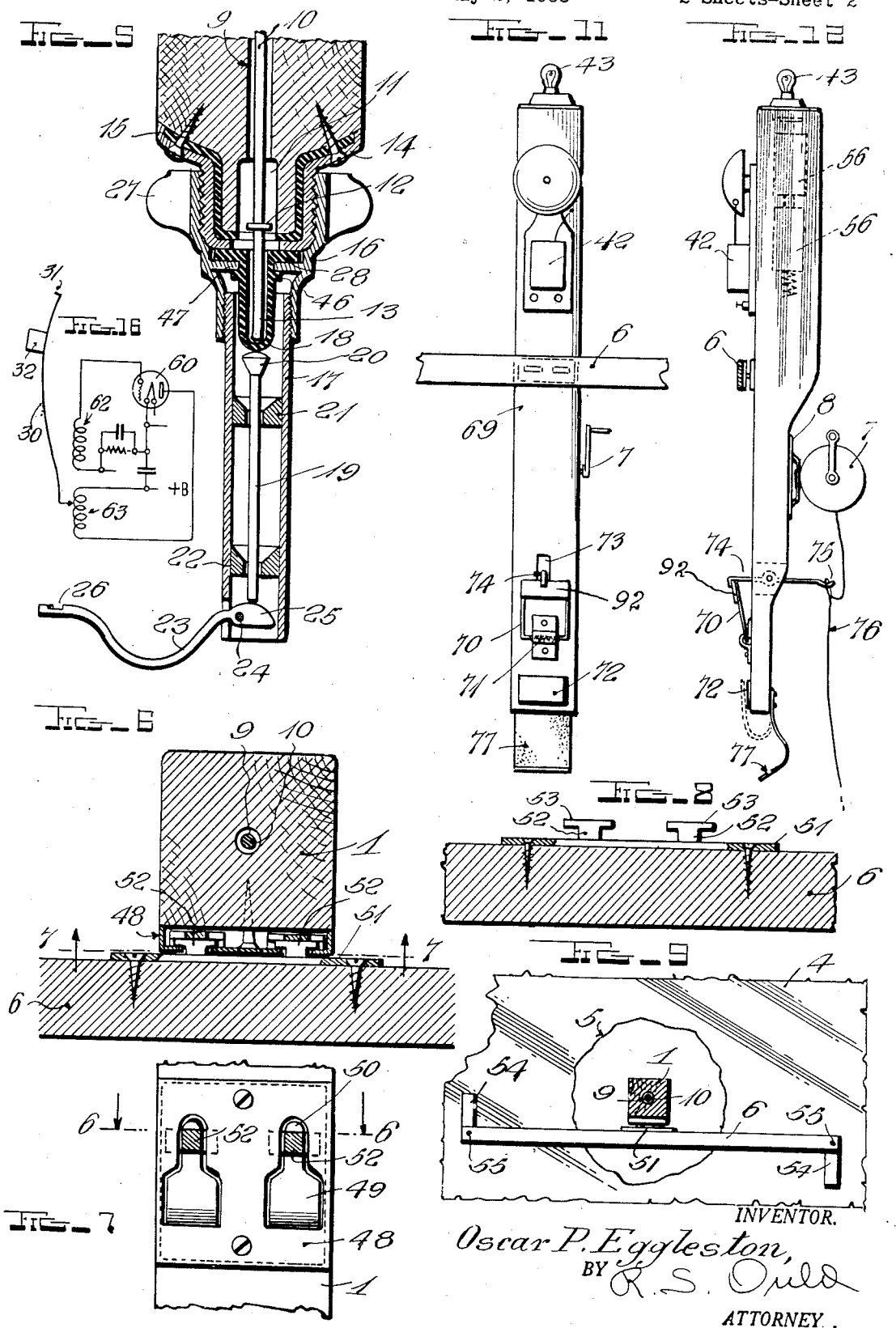
INVENTOR.
Oscar P. Eggleston,
BY R. S. Ould
ATTORNEY.

Patented Aug. 22, 1939

2,170,000

UNITED STATES PATENT OFFICE 2,170,000

NONFREEZE TIP-UP

Oscar P. Eggleston, Theresa, N. Y.

Application May 2, 1938, Serial No. 205,643

19 Claims. (Cl. 43—17)

My invention relates to a device usually called a tip-up for unattended fishing, which will give a positive signal when a fish takes the line, and is particularly adapted for fishing through the ice while avoiding freezing of the operating parts.

It has been heretofore known to provide a device which will display a flag signal when a fish takes the line, but the devices heretofore known have certain marked disadvantages when used for fishing through the ice, particularly the freezing of some of the operating parts so that the signal is not actuated.

It is an object of my invention to provide a tip-up wherein the reel is at all times beneath the ice.

Another object of my invention is to provide a tip-up wherein the operating parts will not freeze when the temperature is below freezing.

Another object of my invention is to provide a tip-up having an erect structural signal member projecting a substantial distance above the surface of the ice, so as to avoid any interference from any ordinary amount of snow likely to be present on the surface of the ice.

A further object of my invention is to provide a tip-up structure wherein the supporting-piece which rests on the ice and holds the erect member in place may be easily disengaged from the erect member, so that if the supporting cross-piece becomes frozen to the surface of the ice, the erect member may still be easily and quickly removed.

A still further object of my invention is to provide a tip-up whose operation is independent of a tilting action, and which will not be operated by a heavy wind.

Still another object of my invention is to provide a tip-up which will give a multiplicity of different kinds of indications, visual, aural, and radio, so that a positive signal will be transmitted under any conditions.

Yet another object of my invention is to provide a tip-up which will discharge a cartridge when a fish takes the line.

Still a further object of my invention is to provide a water-tight seal between the parts immersed in water and the operating parts above water, and thereby avoid freezing of the parts above water.

Yet another object of my invention is to provide a tip-up having a non-metallic channel through the supporting member through which the actuating rod passes, to avoid the freezing of metal to metal.

Still another object of my invention is to provide a tip-up responsive to a relatively feeble pull on the line, and one which is positive in action without the employment of direct-acting springs.

And a further object of my invention is to provide a device which is simple and rugged in structure and dependable in action, and which may be manufactured at low cost in large quantities.

Besides its employment for fishing through the ice, my tip-up may also be used as a fishing float. In the tip-ups heretofore available, the reel has usually been above the ice, and in sub-freezing temperatures when the line gets wet as it comes out of the water, it will freeze on the reel, and also the loop of the line which engages any trigger element of the tip-up will freeze on the trigger element and prevent normal operation, so that when a fish takes the line, the loop will not pull free of the trigger and the fish can steal the bait and get away.

My invention is adapted at one time, upon a fish taking the line, to display a flag, to light an electric light, to ring an electric bell, to discharge a cartridge, and to actuate a short-wave radio transmitter.

My invention will be better understood by reference to the following specification and the accompanying drawings wherein like characters of reference represent corresponding parts in all figures and wherein:

Figure 1 is a general assembled front view in elevation of my invention, in position on the ice;

Figure 2 is a side view with parts broken away showing the flag wire and latch wire in set position;

Figure 3 is a horizontal sectional view taken on the line 3—3 of Figure 2, showing the cartridge barrel and cartridge;

Figure 4 is a detail partly in section of the line-actuated cam engaging the actuating pin;

Figure 5 is an enlarged sectional view of the lower part of the apparatus of Figure 1, showing the resilient nipple water-tight seal through which the actuating releasing thrust is transmitted by the cam;

Figure 6 is a horizontal sectional view taken on the line 6—6 of Figure 7, showing how the vertical bar is locked to the horizontal cross-beam which lies on the ice;

Figure 7 is a detail elevation of the locking plate of the vertical bar;

Figure 8 is a detail of locking plate and studs of the cross-beam;

Figure 9 is an assembled top plan showing the vertical bar in position in a hole in the ice supported by the cross-beam, with the adjustable outrigger legs of the latter in extended position;

Figure 10 is a top plan of the vertical bar showing the central terminal metal sleeve with the flag wire and latch wire in a set position therein;

Figure 11 shows in front elevation a modified form of my invention, with another form of line-actuated latch positioned on the vertical bar beneath the ice;

Figure 12 is a side elevation of the form of Figure 11;

Figure 13 shows in elevation another modification of my invention wherein the armature of the electric bell actuates the latch to release the flag;

Figure 14 shows schematically the circuit wiring diagram of the electrical features of my invention, including the electric lamp, electric bell, and radio transmitter;

Figure 15 shows a detail of the bent terminal portion of the flag wire which holds the same in set position; and Figure 16 shows a detail of the radio transmitter employing the flag wire as the antenna.

Referring to the drawings in detail, in Figure 1, there is shown at 1 the erect vertical bar which carries the operating element, and is provided at its upper end with shoulders 2, 3, which carry signal means including the electric bell, electric light, and radio transmitter. The ice surface is shown at 4 through which a hole 5 which may be some two feet in diameter has been cut, and through which the vertical bar 1 passes from above into the water.

A cross-beam 6, shown in particular in Figures 2 and 9, is laid on the surface of the ice across the hole 5, and at its ends is provided with outrigger legs 54 adjustably pivotally mounted thereon at 55, to maintain the cross-beam 6 in a fixed position on the ice without tipping. The cross-beam 6 is provided with means for removably engaging and supporting the erect bar 1. This means includes (see Figure 8) a plate 51 having projecting studs 52 which are provided with enlarged head portions 53. Mounted on the side of the vertical bar 1 is a locking plate 48 which is provided with slots 49 having narrow upper portions 50 adapted to tightly engage the shank of stud 52. The studs 52 may be inserted in the enlarged lower portions of slots 49 and forced upward into the narrow upper portions thereof so that the heads 53 of studs 52 tightly engage plate 48 and firmly lock vertical member 1 to cross-bar 6. However, by simply raising vertical member 1, it may be instantly disengaged from the cross-beam 6 by passing the heads 53 of studs 52 through the enlarged lower portions of slots 49. Therefore, if cross-beam 6 becomes frozen to the ice as by a thaw and subsequent freeze, the vertical bar 1 with the operating parts can still be instantly pulled upwardly out of the water when a fish takes the line.

Mounted on the bar 1 below the surface of the ice is the reel 7 carried on a mounting plate 8, and carrying the fish line 76.

The vertical bar 1 is provided with a central bore 9 of relatively small diameter which is slightly greater than the diameter of a long actuating rod 10 which passes therethrough and has at its upper end an enlarged head portion 67 which pushes against and releases actuating elements hereafter described. The upper portion of bore 9, to a depth of about one-half inch, is considerably enlarged, and is provided with a peripheral copper sleeve 29 within which the head 67 of rod 10 moves.

The actuating mechanism carried by the lower part of vertical bar 1 is shown particularly in Figure 5. The vertical bar 1 is advantageously of wood, and preferably of a light wood such as basswood, so that it is light to carry. By forming vertical rod 1 of wood, the peripheral surface of bore 9 is non-metallic, so that even if the surface of rod 10 becomes wet and it gets bent so that it contacts the periphery of bore 9, there will be relatively little tendency for them to freeze together and much less such tendency than if the periphery of bore 9 were metallic. By forming the vertical bar 1 of wood, there is also a much poorer conduction of sub-freezing temperatures from without to the interior of bore 9. At the lower portion of bore 9 there is provided an enlarged recess 11. On the lower part of rod 10 there is provided a motion-limiting flange 12 which is adapted to move to and fro in recess 11 and is of such size as to prevent rod 10 from being pulled out of bore 9, since the flange 12 will engage the upper end of recess 11. The lower end 13 of rod 10 below flange 12 projects beyond the vertical bar 1.

A sheet metal terminal cap or cover 14 is provided over the lower end of bar 1 and is separated therefrom by rubber or similar packing 15. The cap 14 and packing 15 are centrally apertured for the passage therethrough of the lower end 13 of rod 10. Cap 14 is provided with lateral threads adapted to engage the threaded inside surface of a metal collar 16. A metal tube 17 of relatively small diameter is threaded at its upper end and adapted to engage the threaded lower terminal portion of metal collar 16. Intermediate of its length, collar 16 is provided with a transverse flange 47 which is centrally apertured.

A rubber nipple 18 is provided having an upper terminal flange 28 and central passage to its tip which receives the lower end 13 of rod 10. The upper terminal flange 28 is held between the lower end of cap 14 and the flange 47 of collar 16. At a point below terminal flange 28, nipple 18 is provided with an intermediate lower flange 46 which engages the lower side of flange 47 of collar 16. Nipple 18 is preferably formed of flexible but tough rubber and has a continuous surface so as to form a hermetic seal to prevent the passage of any water upward from the lower part of tube 47 into the bore 9 of vertical bar 1, forming a transverse diaphragm.

The metal collar 16 is provided with wings 27 to facilitate screwing or unscrewing the same on cap 14, and also to facilitate insertion or removal of tube 17 in collar 16.

An actuating pin 19 is centrally positioned within tube 17 and has a terminal head 20 which is adapted to push against the lower terminal portion of rubber nipple 18 and therethrough transmit a thrust to the lower portion 13 of rod 10. Tube 17 is provided with centering blocks 21, 22, which are centrally apertured to receive pin 19 and on their upper surfaces are bevelled to facilitate assembly.

A cam lever 23 is mounted at the lower end of tube 17 on a pivot 24 about which it freely swings. A suitable aperture is provided in the wall of tube 17 for the passage therethrough of cam lever 23. On its end inside of tube 17, cam lever 23 is provided with a cam surface 25 which is adapted to push against and engage the lower end of pin 19 and transmit a thrust thereto. The outer end of cam lever 23 is provided with a recess or notch 26 adapted to receive and hold a loop of fish line 76. The upper cam surface 25 is so shaped that it easily and positively transmits a thrust of suitable magnitude to pin 19 and rod 10 when a fish pulls on the line attached to the outer end of cam lever 23.

Due to the flexible resilient structure of nipple 18, the thrust on pin 19 is easily and positively transmitted to rod 10, and the nipple 18 will in service withstand many hundreds of cycles of operation without fracture or cracking.

As shown particularly in Figure 2, on one face of the upper end of vertical bar 1 there is attached a wire 30 which has a short angularly bent terminal hook portion or tip 31 which is adapted to extend into and engage the enlarged upper end of bore 9 and the copper sleeve 29 therein. A flag 32 which may be of red color is carried on wire 30 as shown. Wire 30 is relatively long and is flexible, but decidedly resilient, and may advantageously be piano wire doubled. When wire 30 is bent over as shown in Figure 2 so that terminal hook 31 is held within sleeve 29, both the end of wire 30 and the flag 32 are in a relatively low inconspicuous position, but when terminal hook 31 becomes disengaged from sleeve 29, the wire 30 will at once spring upward into substantially a straight erect position and flag 32 is clearly and conspicuously displayed. When an upward thrust is transmitted to rod 10, its terminal head 67 pushes against terminal hook 31 of wire 30 and displaces and releases the same from engagement with sleeve 29, so that wire 30 springs up and flag 32 is displayed. The details of the structure of terminal hook 31 and sleeve 29 are particularly shown in Figure 15.

Mounted on another lateral face of vertical bar 1 is a spring trap structure somewhat similar to a mouse trap, which comprises a trap lever 33 actuatable by a spring 34. At the free end of trap lever 33 is attached a latch wire 35 having a terminal bent hook portion similar to hook 31 of wire 30, and adapted to extend into and engage sleeve 29. Trap lever 33 may be set against the action of spring 34 by pushing the same upwardly so that the terminal portion of latch wire 35 may be dropped into sleeve 29. An upward thrust on rod 10 will thus disengage the hook of latch wire 35 from sleeve 29 and release trap lever 33 so that it springs back into its lower position.

On the upper end of trap lever 33 there is provided a terminal block 36 which is preferably of metal, and is provided with a firing pin 37. A cartridge barrel 38 is provided passing through vertical bar 1 as shown particularly in Figure 2, and is adapted to receive a cartridge 40 whose head engages the head portion 39 of cartridge tube 38. When trap lever 33 is released, its structure is such that firing pin 37 will impinge upon and discharge cartridge 40. Adjacent to and in contact with head portion 39 of cartridge barrel 38, is contact plate 41 which is so constructed that it is engaged by the metallic terminal block 36 of trap lever 33, and since contact plate 41 is metallic, an electrical circuit is closed when the trap lever is sprung and terminal block 36 impinges upon contact plate 41. The details of the electrical circuit closed when such engagement takes place are particularly shown in Figure 14. Cartridge 40 is advantageously a blank of 22 caliber.

Mounted on one side of shoulder 3 on the upper end of vertical bar 1, is the electric bell 42 which is actuated by the engagement of terminal block 36 on contact plate 41. One or more suitable dry cells of the type shown at 56 of Figure 12 are provided, preferably of a flat shape, and mounted within the body of vertical bar 1 in such a manner as to clear bore 9. The plate batteries for the radio transmitter, hereinafter referred to, but not specifically shown in the drawings, are likewise mounted within the body of vertical bar 1, and are now commercially available in extremely small and compact form which may be conveniently retained in vertical bar 1 and its shoulders 2 and 3.

Mounted on the upper surface of shoulder 3 is a miniature incandescent electric lamp 43 which becomes lighted when the electric circuit is closed by terminal block 36 engaging contact plate 41, and this electric lamp 43 is also actuated by a cell such as 56. This electric lamp 43 may be of the type commonly used in flashlights, and at night or at times of low visibility the lighted lamp may be clearly seen from a considerable distance and may be of 1½ volt or other rating.

As shown particularly in Figure 14 the lower contact from dry cell 56 may be made by a spring 57. The dry cell 56 is connected in series through the switch comprising trap terminal block 36 and contact plate 41 to a pair of line signal wires 58, 59. The electric bell 42 and incandescent lamp 43 are connected in parallel across signal wires 58, 59.

Mounted upon and within shoulder 2 on the upper end of vertical bar 1 is an ultra-high frequency or short-wave radio transmitter which in Figure 1 as a whole is indicated at 44, and comprises a dipole antenna 45, 45, extending therefrom vertically with one wire 45 projecting above vertical bar 1. This form of a dipole antenna of dimensions which can be conveniently mounted on a structure such as vertical bar 1, and which may extend only a matter of 8 to 12 inches above the bar, is an efficient transmitter of radio signals of ultra-high frequencies such as of the order of one meter in length. A number of transmitter circuits are known which are adapted for compact embodiment in a very limited space such as is here available, in shoulder 2 and vertical bar 1. A type of circuit suitable for such a compact embodiment is schematically shown in Figure 14 and includes a radio-frequency oscillator tube 60 having a grid coil 62 and a plate coil 63 inductively coupled together, and the plate coil 63 being inductively coupled to one or two turns 64 in dipole 45, 45. The plate and grid coils may also be only one or two turns.

An audio-frequency oscillator is shown at 61 and generates a signal of audio-frequency to modulate the radio-frequency output of radio-frequency oscillator 60. The audio-frequency oscillator 61 has a grid coil 66 and a plate coil 65 which are ferromagnetically coupled. The +B battery supply for oscillators 60 and 61 is applied to the two free terminals marked +B and for this purpose there may be used very compact types of the batteries now commercially available, which may be mounted within vertical bar 1 and its shoulders, as above described.

An ultra-high frequency radio transmitter of the type shown in Figure 14 may be conveniently keyed in a number of different manners, as in the plate circuit or in the filament circuit. For the particular application here in view it is convenient to key the filament circuit. For this purpose, the signal line wires 58, 59, from dry cell 56 through switch 36, 41, may be extended to constitute the filament supply for oscillator tubes 60, 61. In this manner, when trap lever 33 is released and the circuit from the dry cell is closed to signal line wires 58, 59, the radio-transmitter at once causes ultra-high frequency signals to be emitted by dipole 45, 45, and these signals are of a radio-frequency modulated at the audio-frequency of audio-frequency oscillator 61. Such modulated ultra-high-frequency radio waves may be received on a suitable ultrahigh-frequency receiving set which the fisherman may have at a comparatively near point, such as a fishing shack on the ice, or a building on the shore, which is in the optic line of sight and comparatively nearby, so that the relatively feeble radio waves from such a compact transmitter will be clearly received. The receiving set, in known manner, may be arranged to operate any desired type of electric signal within the shack or building where the fisherman may be seeking shelter from inclement weather. Dry cells are available in types which will continue to operate satisfactorily under any weather and temperature conditions likely to be met in fishing. Transmitter circuits other than the one shown in Figure 14 are also known which are susceptible of compact embodiment and are suitable for ultra-high frequency transmission. For different tip-ups, there can be different modulating frequencies of audio-frequency oscillator 61, so that the note of the received signal will identify which tip-up has the strike. The flag wire 30 may be used as the antenna instead of dipole 45. If the flag wire is used as antenna, it may be connected to an intermediate point of plate coil 63, preferably tapping off a relatively small part of the plate voltage at a point just inside the +B connection, as shown in Figure 16. The antenna flag wire may be tuned when in erect actuated position to the desired frequency by clipping off small pieces.

In Figures 11 and 12 there is shown a modified form of my invention which is provided simply with the electric bell 42 and incandescent lamp 43, the reel 7 being as in the arrangement of Figure 1 below the ice. In the arrangement of Figures 11 and 12, the trap lever, shown at 70, is on the lower part of the vertical bar 69 and below the ice. Trap lever 70 has a terminal block 92 which is adapted to engage when released the contact plate 72. The vertical bar 69 is provided adjacent trap lever 70 with a slot 73 through which there passes a latch or trigger member 74, pivotally mounted in slot 73. Latch 74 is provided with a terminal hook adapted to engage and hold the outer end of trap lever 70, and is further provided at its other end with a line recess or notch or hook 75 adapted to receive and hold the fish line 76 from reel 7. It will be obvious that when a fish pulls on line 76, latch 74 will be pulled and will release trap lever 70 so that its terminal block will impinge upon contact plate 72 and close the electrical circuit from the dry cells 56 to actuate bell 42 and lamp 43. A leather thong 77 is provided on the lower end of vertical bar 1 which may be folded over to cover contact plate 72 so that when trap lever 70 is released and in its lower position, the electrical circuit will not be closed; this arrangement is desirable for the purpose of carrying the tip-up from place to place.

In Figure 13 I have shown a still further modification of my invention wherein the latch mechanism is actuated directly by the electric bell. An electric bell is shown at 80 which is provided with an armature and clapper 81. Mounted upon the bell structure and adjacent the clapper is a sleeve member 86 slidably carrying a latch rod 87 positioned substantially at right angles to the length of clapper 81 and substantially in the direction of its motion. At the end of latch rod 87 distant from the clapper there is provided a terminal portion. A flag wire 82 is mounted upon or adjacent the bell structure at one of its ends and at its other end is provided with a hooked portion 84 adapted to engage a shoulder in a latch block 85. This structure is such that the flag wire 82 may be set with its terminal hook 84 engaging the shoulder of latch block 85, and will there be firmly held. A flag 83 is carried near the free end of flag wire 82. The latch rod 87 is so positioned that when it is pushed by the action of clapper 81, its terminal portion will push against and displace the hook 84 of flag wire 82 and release the same, whereby the flag wire 82 will spring upwardly substantially vertically, and the flag will be displayed.

The flag release arrangement of Figure 13 can conveniently be added to the bell arrangement of Figure 11 which as shown includes no flag, and when the fisherman hears a bell ringing, he will identify by the displayed flag where a fish is on the line.

In fishing through the ice, it is customary for one fisherman to maintain fifteen or more tip-ups, depending on the provisions of the laws of the State involved. As a practical matter, these are spaced an appreciable distance apart, to give a diversity of fishing grounds. It is, therefore, important that the fisherman shall be at once warned when a fish has taken the line, and shall identify which tip-up has the strike, so that he can at once go and pull in the fish before it breaks away. The signal must be positively transmitted from an appreciable distance, under various different conditions of the elements, hence it is important to provide a number of different kinds of signals. The flag is a suitable alarm for short distances, and in any case is identification after it is known that there is a strike, as indicated by some other alarm. The electric light can be seen over long distances at night or under conditions of poor visibility. The electric bell will carry considerable distances over the ice under normal conditions. If the wind is adverse, the cartridge shot will carry much better than the electric bell. The radio signal will be positively transmitted under any conditions of the elements.

In practice, I find that a convenient embodiment of my invention employs a vertical bar 1 about 2 inches square and 14 or 16 inches long, and may have the shoulders 2, 3, extending out some 2 inches, depending on how much auxiliary apparatus they are to contain. As shown particularly in the form of Figure 12, the lower part of bar 1 can be made narrower to save weight, and in this form the latch 74 may be about 3 inches long. In the form of Figure 2, the rod 10 may be conveniently of diameter of one-eighth inch. Rubber nipples suitable for use as my element 18 with characteristics of suitable resilience and ruggedness, are available commercially.

The apparatus which I have described has been found to be simple and rugged in construction and reliable in operation. I have described my invention by reference to particular embodiments as examples. It will be obvious that I have provided a very useful and novel device, and to those skilled in the art it will be obvious that I have provided a device which is susceptible of various embodiments and modifications and variations, and all such embodiments which are comprehended within the scope of the appended claims I consider to be a part of my invention.

Having thus described my invention what is claimed is:

1. In a tip-up, an upright bar, means for supporting said bar partly immersed in water, a trigger lever pivotally carried by said bar on its portion below water and having a cam terminal portion on one end, said lever normally projecting laterally from said bar and having at its other end a hook portion adapted to receive a fish-line, signal means normally resiliently assuming actuated position when unrestrained, latch means cooperating with said signal means for holding said signal means in unactuated position when set, and means passing through the interior of said bar and engageable with and actuatable by said cam terminal portion of said lever for releasing said latch means and thereby releasing said signal means into actuated position.

2. In a tip-up, an upright bar, means for supporting said bar partly immersed in water, said bar being provided with a central bore, rod means displaceable within said bore, means carried on the end of said bar below water and actuatable by a pull on a fish-line for displacing said rod means, a latch wire having a bent terminal portion engageable in the upper end of said bore into a set position, and signal means actuatable by the displacement of said latch wire from engagement with said bore by the displacement of said rod means thereagainst.

3. In a tip-up, an upright bar, means for supporting said bar partly immersed in water, said bar being provided with a central bore, the portion of said bar immediately adjacent said bore being non-metallic, rod means displaceable within said bore, means carried on the end of said bar below water and actuatable by a pull on a fish-line for displacing said rod means, a latch carried on the upper portion of said bar and releasable from set position by displacement of said rod means, and signal means actuatable by the release of said latch from set position.

4. In a tip-up, an upright bar, means for supporting said bar partly immersed in water, said bar being provided with a central bore, rod means displaceable within said bore, a lever pivotally mounted on the end of said bar below water and having a cam surface engageable with an end of said rod means, said lever being actuatable by a pull of a fish-line thereon, a latch carried on the upper portion of said bar and releasable from set position by displacement of said rod means, and signal means actuatable by the release of said latch from set position.

5. In a tip-up, an upright bar, means for supporting said bar partly immersed in water, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, a latch carried on the upper portion of said bar and releasable from set position by displacement of the upper one of said rods, and signal means actuatable by the release of said latch from set position.

6. In a tip-up, a line-engaging lever, a pivot for mounting said lever, a first tubular terminal member carrying said pivot, a pin slidably displaceable within said tubular member, said lever being mounted to engage when displaced the free end of said pin, a second tubular member engageable with one end of said first tubular member, continuous resilient diaphragm water seal means positioned across and closing the communicating passage between said first and second tubular members, a rod slidably displaceable within said second tubular member when impinged upon by said pin acting through said resilient diaphragm seal means, trigger means mounted on said second tubular member and releasable when said rod is actuated, and signal means actuatable by said trigger means.

7. In a tip-up, an upright bar, means for supporting said bar partly immersed in water, said bar being provided with a central bore, a pair of rods colinearly positioned in said bore with ends adjacent, a resilient flexible nipple member positioned between the adjacent ends of said rods and completely hermetically closing said bore and receiving one of said rods into the passage of said nipple, means carried on the end of said bar below water and actuatable by a pull on a fish-line for displacing the lower one of said rods, a latch carried on the upper portion of said bar and releasable from set position by displacement of the upper one of said rods, and signal means actuatable by the release of said latch from set position.

8. In a tip-up, an upright bar, a cross-piece adapted to extend across a hole in ice, said bar and cross-piece being provided with mutually engaging socket and shoulder interlocking means adapted to firmly but instantaneously separably lock the same together with said bar supported upright by said cross-piece, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, a latch carried on the upper portion of said bar and releasable from set position by displacement of the upper one of said rods, and signal means actuatable by the release of said latch from set position.

9. In a tip-up, an upright bar, means for supporting said bar partly immersed in water, a trigger lever pivotally carried by said bar on its portion below water and having a cam terminal portion on one end, said lever normally projecting laterally from said bar and having at its other end a hook portion adapted to receive a fish-line, a cartridge barrel carried on the portion of said bar above water, a spring-actuated hammer member adapted when actuated to discharge a cartridge carried in said barrel, latch means for retaining said hammer member in cocked position and actuatable when released to discharge said cartridge, and means passing through the interior of said bar and engageable and actuatable by said cam terminal portion of said lever for releasing said latch means.

10. In a tip-up, an upright bar, means for supporting said bar partly immersed in water, a lever carried by said bar on its portion below water, controllable radiant energy signaling means carried on said bar for signaling by radiant energy, resiliently actuatable actuating means for causing said signaling means to signal by radiant energy, latch means cooperating with said actuating means for holding the same in unactuated position when set and for causing the same to assume the actuated position when released, and means actuatable by said lever and passing through the interior of said bar for releasing said latch means.

11. In a tip-up, an upright bar, means for supporting said bar partly immersed in water, a lever carried by said bar on its portion below water, a plurality of controllable radiant energy signaling means carried on said bar and respectively adapted for signaling by different forms of radiant energy, resiliently actuatable actuating means for causing said signaling means to signal by radiant energy, latch means cooperating with said actuating means for holding the same in unactuated position when set and for causing the same to assume the actuated position when released, and means actuatable by said lever and passing through the interior of said bar for releasing said latch means.

12. In a tip-up, an upright bar, means for supporting said bar partly immersed in water, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, a latch carried on the upper portion of said bar and releasable from set position by displacement of the upper one of said rods, a radio transmitting set carried on said bar, and a resiliently actuatable switch member for keying said set, said latch being engageable with said switch member for holding the same in unactuated position when set.

13. In a tip-up, an upright bar, means for supporting said bar partly immersed in water, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, a latch carried on the upper portion of said bar and releasable from set position by displacement of the upper one of said rods, a cartridge barrel carried on the portion of said bar above water, and a spring-actuated hammer member adapted when actuated to discharge a cartridge carried in said barrel, said latch being adapted for retaining said hammer member in cocked position and actuatable when released to discharge said cartridge.

14. In a tip-up, an upright bar, means for supporting said bar partly immersed in water, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, a resilient flag wire having a portion thereof mounted on said bar, retaining means on said bar for retaining a free end of said flag wire, and a flag carried on said flag wire, said flag wire and retaining means being so arranged that displacement of the upper one of said rods releases said flag wire from said retaining means and displays said flag.

15. In a tip-up, an upright bar, means for supporting said bar partly immersed in water, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, latch means carried on the upper portion of said bar and releasable from set position by displacement of the upper one of said rods, controllable radiant energy signaling means carried on said bar for signaling by radiant energy, and actuating means for causing said radiant energy signaling means to signal by radiant energy, said latch means being engageable with said actuating means for holding the same in unactuated position when set and for causing the same to assume the actuated position when released.

16. In a tip-up, an upright bar, means for supporting said bar partly immersed in water, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, visual signal means carried on said bar, and control means adapted to release said visual signal means into display condition, said control means being releasable from set conditions by displacement of the upper one of said rods.

17. In a tip-up, an upright bar, means for supporting said bar partly immersed in water, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, acoustic signal means carried on said bar, and control means adapted to release said acoustic signal means into acoustic operating condition, said control means being releasable from set condition by displacement of the upper one of said rods.

18. In a tip-up, an upright bar, means for supporting said bar partly immersed in water, said bar being provided with a central bore, a pair of rods colinearly positioned in said bore with ends adjacent, a continuous resilient diaphragm inserted between the adjacent ends of said rods and completely hermetically closing said bore, means carried on the end of said bar below water and actuatable by a pull on a fish-line for displacing the lower one of said rods, latch means carried on the upper portion of said bar and releasable from set position by displacement of the upper one of said rods, a resilient flag wire having a portion thereof mounted on said bar and normally held in set position, a flag carried on said flag wire, a radio transmitting set carried on said bar, said flag wire being releasable from set position into display position by displacement of the upper one of said rods, and keying means for said set actuatable by the release of said latch means to cause said set to emit radio signals, whereby displacement of the upper one of said rods causes signaling by both said flag and said radio transmitting set.

19. The subject matter of claim 18, said radio transmitting set comprising said flag wire as its antenna.

OSCAR P. EGGLESTON.